Sept. 28, 1965   U. KNIPP ETAL   3,208,500
VEHICLE TIRE
Filed June 20, 1962

INVENTORS:
ULRICH KNIPP, KARL OBERBACH.
BY
ATTORNEY

United States Patent Office 3,208,500
Patented Sept. 28, 1965

3,208,500
VEHICLE TIRE
Ulrich Knipp, Leverkusen, and Karl Oberbach, Berg, Gladbach, Germany, assignors to Farbenfabriken Bayer Aktiengesellschaft, Leverkusen, Germany, a corporation of Germany
Filed June 20, 1962, Ser. No. 203,810
Claims priority, application Germany, June 23, 1961, F 34,257
6 Claims. (Cl. 152—327)

This invention relates to a vehicle tire and more particularly to an improved vehicle tire made from synthetic materials.

The structure of conventional pneumatic tires most commonly used on all types of vehicles comprises generally a resilient cover, a tread and a carcass made of natural or synthetic rubber and reinforced by fabric inserts to which an internal air pressure is applied. Although the construction of this so called conventional rubber pneumatic tire meets the required standards in many applications, absolute reliability of this tire in certain fields of use in which the stresses are particularly high, such as, for example, in aircraft tires, is not guaranteed to the required standards although the tire might have all of the physical characteristics required for proper functioning. Besides the problem of reliability of conventional fabric-reinforced pneumatic tires, the manufacture of such tires is quite complicated. In making a conventional pneumatic tire, different rubber mixtures must be prepared according to the ultimate purpose of the tire. Care must be taken in providing a suitable cover and carcass and in cutting and prefabricating the fabric reinforcements, all of which involves a large number of working steps consequently making the process quite involved and quite complex.

It is, therefore, an object of this invention to provide a tire suitable for all types of vehicles which is simple to construct and which is more reliable. It is an object of this invention to provide a vehicle tire which is puncture proof and deflation proof and capable of withstanding high stresses. It is another object of this invention to provide a vehicle tire not requiring an internal air pressure and made of polyurethane plastic or polyamide plastic having suspension properties equal to a conventional pneumatic tire.

Generally speaking, the foregoing objects and others are accomplished by providing a tire of special construction suitable for all types of vehicles, which comprises a self-supporting, thin-walled, toroidal shaped, internally open element for the body of the tire and which is made of a polyurethane plastic or a polyamide plastic having an elasticity modulus at least about 750 kg./cm.$^2$. It has been found that a tire can be made from a polyurethane and/or a polyamide having such a modulus and that such a tire is deflation proof in use, has suspension properties equal to those of a conventional pneumatic tire, does not require an internal air pressure to support the vehicle and does not require the reinforcing fabric layers necessary in a pneumatic tire. The use of a material having an elasticity modulus at least about 750 kg./cm.$^2$, about 10 times higher than the rubber used in a conventional pneumatic tire, makes it possible to construct a tire that does not require an internal air pressure and that does not have inferior suspension properties compared to a pneumatic tire. In accordance with this invention, a tire of substantially lighter construction than the pneumatic tires can be prepared since it is possible to dispense with the thick fabric layers necessary in the pneumatic tires.

Other objects will become apparent from the following description with reference to the accompanying drawings in which.

Figure 1:
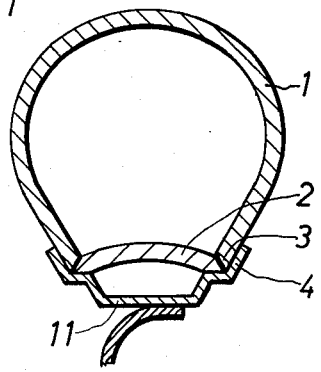
FIGURE 1 illustrates a cross sectional view of a vehicle tire in accordance with a preferred embodiment of the present invention.

Referring now to the drawings, FIGURE 1 illustrates a hollow, internally open, thin-walled, self-supporting tire 1, constructed by casting either polyurethane plastic or polyamide plastic having an elasticity modulus of at least about 750 kg./cm.$^2$ in a suitable tire mold. The thin-walled tire body 1, comprising what would generally be considered the carcass, sidewalls and tread portion of a pneumatic tire, is held in place against the flanges of a conventional wheel rim 11 by a resilient cylindrical spacing ring 2, preferably constructed of the same material as the tire body 1, within the tire body 1 and adjacent the flanges 4 of the rim 11. The tire body 1 is under axial pretensioning, does not have an internal air pressure, and is puncture-proof and deflation proof.

Figure 2:
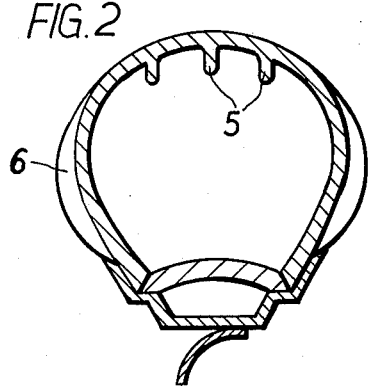
FIGURE 2 illustrates a cross sectional view of another embodiment of the invention having reinforcing ribs.

FIGURE 2 illustrates the internally-open, thin-walled, self-supporting tire body 1 of FIGURE 1 having reinforcing ribs 5 and 6 incorporated therein. Reinforcing ribs 5 and/or 6 are cast with the tire body and are made of the same polyurethane plastic or polyamide plastic as described for the tire body of FIGURE 1. The reinforcing ribs 5 are arranged in the peripheral direction on the internal portion of the tire body and are considered part of the tire body. The peripheral direction for the purpose of this invention will be known as that direction on the tire that extends longitudinally around the circumference of the tire. The reinforcing ribs can also be arranged in a radial direction on the tire body, as illustrated by the reinforcing ribs 6, both externally and/or internally on the tire body. The radial direction for the purpose of this invention will be known as that direction on the tire that extends laterally around the tire from the portion of the tire adjacent the flange of the wheel rim through the lateral wall or sidewall, the tread portion, the other lateral wall to that portion of the tire adjacent the flange opposite the above-described flange. When a tire is provided with one or more radially located reinforcing ribs arranged internally and/or externally and/or in a peripheral location on the tire body, the loading capacity and the lateral stability of the tire is increased.

Figure 3:
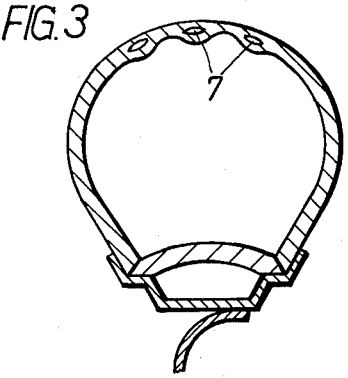
FIGURE 3 is a cross sectional view illustrating another embodiment of a reinforced tire.

According to the invention, it is also possible to incorporate metallic reinforcements into the tire body of the tire described in FIGURE 1. Metallic reinforcements of any desired cross-section, such as, for example, steel and the like, can be fitted peripherally and/or radially into the tire body during the manufacture thereof in order to increase the loading capacity of the tire. FIGURE 3 illustrates such a tire construction, wherein, metallic rings 7 of any desired cross-section are provided in a peripheral direction and are embedded within the thin wall of the tire body.

Figure 4:
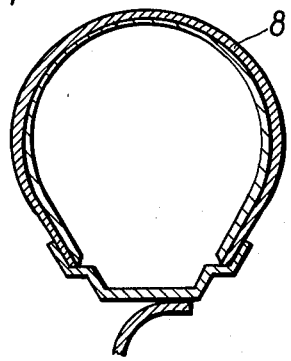
FIGURE 4 illustrates a further cross sectional view of a tire that is reinforced over the entire cross section.
Figure 5:
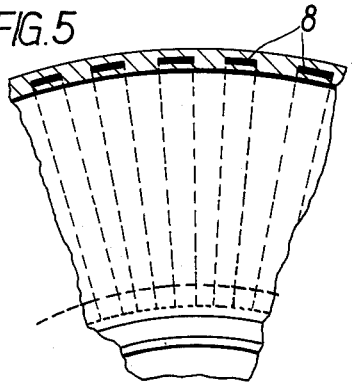
FIGURE 5 illustrates a side elevational view of the reinforcing member of FIGURE 4.

Another embodiment of the present invention is illustrated in FIGURES 4 and 5. These figures show a tire construction as described in FIGURE 1 in cross-section and side elevation respectively wherein radially arranged metallic reinforcements 8 comprising flat, rectangular metal bands having a complementary cross-sectional configuration to the tire body shown in FIGURE 4 and are embedded therein. A plurality of these metallic reinforcing bands are embedded into the tire body as shown in FIGURE 5 and extend along the peripheral direction of the tire body reinforcing the entire cross-section thereof.

Figure 6:
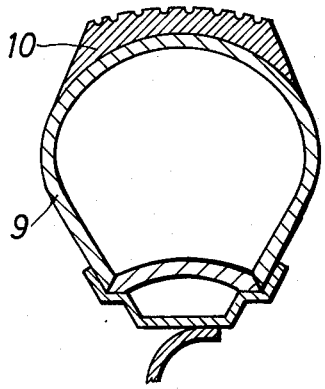
FIGURE 6 illustrates a further embodiment of the invention having a tread applied to the tire body.

As stated hereinbefore, the vehicle tires of the present invention are prepared from a plastic material having an elasticity modulus of at least about 750 kg./cm.$^2$. Although, tires prepared from materials having such a high elasticity modulus are suitable for many purposes it might be that for some special purposes it would be advantageous to have a tire which is more flexible. At times it might be advantageous to employ a tire having the physical properties or characteristics of the tire provided and described herein except that the tire is too rigid or stiff. Under such circumstances, the invention contemplates a tire having the body described above and a tread of a softer material. FIGURE 6 illustrates a tire body such as that described in FIGURE 1 having a tread 10 applied thereto by means of a suitable adhesive, by attaching during the casting step, or by any other suitable means. The application of a tread surface comprising a softer material than that used in the construction of the tire body, such as, for example, natural or synthetic rubber or of a softer plastic, to the tire body increases the road adhesion of a tire to be used on a motor vehicle such as, for example, an automobile and the like.

Any suitable polyurethane plastic or polyamide plastic may be used. Suitable polyamides, long-chain synthetic polymeric amides having recurring amide groups as an integral part of the main polymer chain, can be prepared in known manner. For example, polyamides can be prepared by the condensation of diamines and dibasic acids, by the condensation of polycarboxylic acids with polyamines, or by the polycondensation of caprolactam. Other methods are known for the preparation of the above-described polyamides and are found in the "Encyclopedia of Chemical Technology," vol. 10, pages 916–937, published by Interscience Publishers, Inc., 1953, and especially the patents lisited on pages 934–937. The polyamide is not formed by self-addition and does not have the same empirical composition of either of the initial reactants. After heating the reactants of a polyamide to a temperature at which condensation of the —NH$_2$ and —COOH groups occurs, water is released and —CONH— linkages are formed. Any suitable diamine, such as, for example, ethylene diamine, diethylene diamine, pentamethylene diamine, hexamethylene diamine, decamethylene diamine, phenylene diamine, mixtures thereof, and the like may be used to prepare the polyamides of the present invention. Any suitable triamine may also be used, such as, for example, diethylene triamine and the like. Suitable polybasic acids ranging from succinic acid to sebacic acid have been used to prepare suitable polyamides, such as, for example, succinic acid, aconic acid, adipic acid, malic acid, oxalacetic acid, pyrotartaric acid, itaconic acid, fumaric acid, mixtures thereof and the like. ε-Caprolactam,

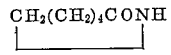

suitable for use in preparing polyamides, can be produced by the Beckman rearrangement of cyclohexanone oxime,

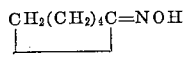

Any suitable polyurethane plastic can be prepared by reacting an organic compound containing active hydrogen atoms which are reactive with —NCO groups with an organic polyisocyanate. In many instances, it is also desirable to incorporate into the reaction formulation a chain extending agent which is an organic compound containing active hydrogen atoms reactive wtih isocyanate groups and having a molecular weight generally less than about 500 where the active hydrogen atoms are selected from hydroxyl groups, amino groups and carboxyl groups.

Any suitable organic compound containing active hydrogen atoms which are reactive wtih —NCO groups may be used in the fabrication of suitable polyurethane plastics such as, for example, hydroxyl polyesters, polyester amides, polyhydric polyalkylene ethers, polyhydric polythioethers, polyacetals and the like. Any suitable hydroxyl polyester may be used such as, for example, the reaction product of a polycarboxylic acid and a polyhydric alcohol. Any suitable polycarboxylic acid may be used in the preparation of the polyesters such as, for example, adipic acid, succinic acid, suberic acid, sebacic acid, oxalic acid, methyl adipic acid, glutaric acid, pimelic acid, azelac acid, phthalic acid, terephthalic acid, isophthalic acid, thiodglycollic acid, thiodipropionic acid, maleic acid, fumaric acd, citraconic acid, itaconic acid, benzene tricarboxylic acid and the like. Of course, the corresponding acid anhydrides may also be used. Any suitable polyhydric alcohol may be used in the preparation of the polyesters such as, for example, ethylene glycol, propylene glycol, butylene glycol, hexanediol, bis-(hydroxymethyl cyclohexane), 1,4-butanediol, diethylene glycol, polyethylene glycol, 2,2-dimethyl propylene glycol, xylylene glycol, trimethylol ethane, trimethylol propane, glycerine, pentaerythritol, sorbitol, and the like.

Any suitable polyhydric polyalkylene ether may be used such as, for example, the condensation product of an alkylene oxide with a small amount of a compound containing active hydrogen containing groups such as, for example, water, ethylene glycol, propylene glycol, butylene glycol, amylene glycol and the like. Any suitable alkylene oxide condensate may also be used such as, for example, condensates of ethylene oxide, propylene oxide, butylene oxide, amylene oxide, styrene oxide, and mixtures thereof. The polyalkylene ethers prepared from tetrahydrofuran may also be used. The polyhydric polyalkylene ethers may be prepared by any known process such as, for example, the process described by Wurtz in 1859 and in the "Encyclopedia of Chemical Technology"; volume 7, pages 257 to 262, published by Interscience Publishers in 1951 or in U.S. Patent 1,922,459.

Any suitable polyhydric polythioether may be used such as, for example, the reaction product of one of the aforementioned alkylene oxides used in the preparation of the polyhydric polyalkylene ether with a polyhydric thioether such as, for example, thiodiglycol, 3,3'-dihydroxy propyl sulphide, 4,4'-dihydroxy butyl sulphide, 1,4-(β-hydroxy ethyl) phenylene dithioether and the like.

Any suitable polyester amide may be used such as, for example, the reaction product of an amine and/or amino alcohol with a carboxylic acid. Any suitable amine such as, for example, ethylene diamine, propylene diamine, and the like may be used. Any suitable amino alcohol such as, for example, β-hydroxy ethyl amine and the like may be used. Any suitable polycarboxylic acid may be used such as, for example, those more particularly described above for the preparation of the hydroxyl polyesters. Further, a mixture of a glycol and an amino alcohol or polyamine may be used. Any of the glycols mentioned for the preparation of the polyesters may be used.

Any suitable polyacetal may be used such as, for example, the reaction product of an aldehyde and a polyhydric alcohol. Any suitable aldehyde may be used such as, for example, formaldehyde, paraldehyde, butylaldehyde, and the like. Any of the polyhydric alcohols mentioned above in the preparation of the hydroxyl polyesters may be used.

Any suitable organic polyisocyanate may be used in the process of this invention such as, for example, aliphatic, aromatic, alicyclic, and heterocyclic polyisocyanates including such as, for example, ethylene diisocyanate, ethylidene diisocyanate, propylene diisocyanate, butylene diisocyanate, cyclopentylene-1,3-diisocyanate, cyclohexylene-1,4-diisocyanate, cyclohexylene-1,2-diisocyanate, 2,4-tolylene diisocyanate, 2,6-tolylene diisocynate, 4,4'-diphenyl methane diisocyanate, 2,2'-diphenyl propane-4,4'-diisocyanate, 3,3'-dimethyl diphenyl methane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenyl sulphone-4,4'-diisocyanate, dichlorohexamethylene diisocyanate, tetramethylene diisocyanate, pentamethylene diisocyanate, hexamethylene diisocyanate, 1-chlorobenzene-2,4-diisocyanate, furfurylidene diisocyanate, 2,7-diisocyanato-dibenzofuran, 1,3,5-benzene-triisocyanate, 2,4,6-tolylene triisocyanate, triphenyl methane triisocyanate, tetraphenyl methane tetraisocyanate, and the like. It is preferred, however, that diisocyanates and particularly aromatic diisocyanates be used. Best results are obtained using diphenyl alkane diisocyanates or 4,4'-diphenyl methane diisocyanate.

Any suitable mixture of the aforementioned isocyanates as well as unrefined or crude isocyanates may also be used. For example, crude toluylene diisocyanates can be obtained by the phosgenation of a mixture of toluylene diamines and crude diphenylmethane isocyanates can be obtained by the phosgenation of crude diphenylmethane diamine, the reaction product of aniline and formaldehyde in the presence of HCl.

Any suitable chain extending agent having a molecular weight less than 500 and having active hydrogen atoms which are reactive with isocyanate groups may be used such as, for example, polyhydric alcohols including ethylene glycol, propylene glycol, butylene glycol, 1,4-butanediol, butenediol, butynediol, xylylene glycol, amylene glycol, 1,4-phenylene-bis($\beta$-hydroxy ethyl ether), 1,3-phenylene-bis-($\beta$-hydroxy ethyl ether), bis-(hydroxy methyl-cyclohexane), hexanediol, thiodiglycol, trimethylolethane, trimethylol propane, glycerine, pentaerythritol, and the like; polyamines such as, for example, ethylene diamine, propylene diamine, butylene diamine, hexamethylene diamine, cyclohexylene diamine, phenylene diamine, toluylene diamine, xylylene diamine, 3,3'-dichlorobenzidene, 3,3'-dinitrobenzidene, 4,4'-methylene-bis-(2-chloro aniline), 3,3-dichloro-4,4'-biphenyl diamine, 2,6-diamino pyridine, 4,4'-diamino diphenyl methane, and the like; alkanol amines such as, for example, ethanol amine, aminopropyl alcohol, 2,2-dimethyl propanol amine, 3-amino cyclohexyl alcohol, p-amino benzyl alcohol, and the like.

It is often advantageous to carry out the reaction in the presence of a catalyst. Suitable catalysts include, for example, such as, triethylene diamine, N-methyl morpholine, N-ethyl morpholine, diethyl ethanolamine, N-coco morpholine, 1-methyl-4-dimethylamine ethyl piperazine, 3-methoxy-N-dimethyl propyl amine, N-dimethyl-N'-methyl isopropyl propylene diamine, N,N-diethyl-3-diethyl amino propyl amine, dimethyl benzyl amine and the like. Other suitable catalysts are for example, tin compounds such as stannous chloride, tin salts of carboxylic acids, such as dibutyl tin di-2-ethyl hexoate, tin alcoholates such as stannous octoate, stannous oleate and the like as well as other organo metallic compounds such as are disclosed in U.S. Patent No. 2,846,408 and in copending application Serial No. 835,450.

Any suitable tire mold may be used for the purpose of the invention. The mold to be used in a given case for producing tires depends on the technique required for the processing of the plastic material used. Polyurethane elastomers which can be processed by the methods applied in the rubber industry can be placed in conventional molds to produce tires according to the invention. Plastics which are capable of being cast are preferably made into tires according to the centrifugal casting process. Thermoplastics are preferably made into tires according to the invention by injection molding in suitable molds.

It is to be understood that the tire provided by this invention is suitable for all types of vehicles, such as, for example, airplanes, automobiles, bicycles, farm implements, and the like.

The invention is further illustrated by the following examples in which the parts are by weight unless otherwise specified.

*Example 1*

Into about 100 parts of a polythioether having an OH-number of about 56 and dehydrated for about 2 hours at about 135° C. is added about 50 parts of naphthylene-1,5-diisocyanate at about 155° C. After about 15 minutes, about 15 parts of 2,3-butylene glycol are thoroughly mixed therein by stirring; this melt is poured into a steel tire mold which has been preheated to about 120° C. After about 20 minutes the tire is removed from the tire mold and is tempered for about another 24 hours at about 110° C. The resulting tire has a diameter of 61.5 cm., a wall thickness of 0.8 cm., an elasticity modulus of 2,500 kg./cm$^2$, and is adaptable for use on VW cars. Five spring wires of 3.5 mm. thickness are embedded in the tires in peripheral direction.

*Example 2*

A normal commercial 6-polyamide dried in vacuo at about 80° C. is heated in vacuo to about 230 to about 240° C. and is then poured in a nitrogen atmosphere into steel tire molds preheated to about 100° C. The resulting tires can be removed from the tire mold immediately after casting and are stored for another 8 days in water. The resulting tire has a diameter of 22 cm., a wall thickness of 0.5 cm., an elasticity modulus of 6,000 kg./cm$^2$, and is adaptable for use on test machines.

In the above description and specific examples there have been shown polyurethanes and polyamides suitable for use in all types of vehicle tires. It is to be understood that any other suitable method for the preparation of the polyamides and polyurethanes prepared herein can be substituted for the particular ones employed in the preceding examples with satisfactory results providing the teachings of the preceding disclosure are followed.

Although the invention has been described in considerable detail in the foregoing for the purpose of illustration, it is to be understood that such detail is solely for this purpose and that variations can be made therein by those skilled in the art without departing from the spirit and scope of the invention except as set forth in the claims.

What is claimed is:

1. A puncture-proof, deflation-proof, self-supporting, light, thin-walled vehicle tire, prepared by casting a member selected from the group consisting of a polyurethane and a polyamide in a unitary construction having a high load capacity and lateral stability, said group member having a modulus of elasticity of at least about 750 kg./cm$^2$.

2. A tire according to claim 1 wherein said tire is reinforced by at least two ribs arranged in the radial direction.

3. A tire according to claim 1 wherein said tire is reinforced by at least one rib arranged in the peripheral direction.

4. A tire according to claim 1 wherein said tire is reinforced by ribs arranged in the radial and in the peripheral direction.

5. A tire according to claim 1 wherein metallic reinforcements of any suitable cross-section are embedded in the thin wall of the tire and are arranged peripherally thereof.

6. A tire according to claim 5 wherein the metallic reinforcements are arranged in the radial direction.

(References on following page)

References Cited by the Examiner

UNITED STATES PATENTS

| | | | |
|---|---|---|---|
| 597,831 | 1/98 | Kohnert | 152—196 X |
| 1,311,883 | 8/19 | Eubank | 152—198 |
| 1,827,668 | 10/31 | Musselman | 152—330 |
| 2,552,336 | 5/51 | Marcum | 152—400 |
| 2,574,233 | 11/51 | Wolf | 152—330 |
| 2,621,166 | 12/52 | Schmidt et al. | 260—75 |
| 2,695,047 | 11/54 | Ruck | 152—330 |
| 2,729,618 | 1/56 | Muller et al. | 260—2.5 |
| 2,757,701 | 8/56 | Henson | 152—362 X |
| 2,902,072 | 9/59 | Reuter | 152—330 |
| 2,925,623 | 2/60 | Beckadolph | 18—59 |
| 2,935,357 | 5/60 | Sutowski | 301—5 |
| 2,951,523 | 9/60 | Madden et al. | |
| 2,953,184 | 9/60 | Erstad | 152—363 |
| 3,016,365 | 1/62 | Holschmidt | 260—2.5 |
| 3,048,447 | 8/62 | Klint | 301—5 X |

OTHER REFERENCES

"Polymide Resins," Floyd, Reinhold Publishing Co., New York, 1958, page 12.

ARTHUR L. LA POINT, *Primary Examiner.*

ROBERT C. RIORDON, *Examiner.*